(12) United States Patent
Voss et al.

(10) Patent No.: US 11,341,234 B1
(45) Date of Patent: May 24, 2022

(54) SYSTEM FOR SECURELY RECOVERING BACKUP AND DATA PROTECTION INFRASTRUCTURE

(71) Applicant: EMC IP Holding Company LLC, Hopkinton, MA (US)

(72) Inventors: Stefan Voss, Milton, MA (US); Sadagopan Balaraman, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 299 days.

(21) Appl. No.: 16/432,195

(22) Filed: Jun. 5, 2019

(51) Int. Cl.
*G06F 21/53* (2013.01)
*G06F 11/14* (2006.01)

(52) U.S. Cl.
CPC .......... *G06F 21/53* (2013.01); *G06F 11/1451* (2013.01); *G06F 11/1469* (2013.01); *G06F 2201/82* (2013.01); *G06F 2221/2149* (2013.01)

(58) Field of Classification Search
CPC .. G06F 21/53; G06F 11/1451; G06F 11/1469; G06F 2201/82; G06F 2221/2149
USPC ........................................................ 726/22
See application file for complete search history.

(56) References Cited

U.S. PATENT DOCUMENTS

| 10,601,856 | B1* | 3/2020 | Natanzon | G06F 21/577 |
| 2012/0136831 | A1* | 5/2012 | Wang | G06F 11/1402 |
| | | | | 707/674 |
| 2019/0034285 | A1* | 1/2019 | Knechtel | G06F 9/52 |
| 2019/0052604 | A1* | 2/2019 | Coleman | H04L 63/1441 |
| 2020/0241969 | A1* | 7/2020 | Shveidel | G06F 16/273 |

FOREIGN PATENT DOCUMENTS

CN 107506295 A * 12/2017

* cited by examiner

*Primary Examiner* — Jacob Lipman
(74) *Attorney, Agent, or Firm* — Dergosits & Noah LLP; Todd A. Noah

(57) ABSTRACT

Described is a system that securely recovers critical backup and data protection infrastructure such as a backup application that manages data for a backup and recovery system. Such a capability may be provided by securely storing a copy of metadata associated with a production backup application into an isolated recovery environment. By storing the metadata on the isolated recovery environment, the metadata may be secure from potential security threats such as ransomware that may attack the production infrastructure itself. Accordingly, the secure copy of metadata may then be restored to a sandboxed environment with the isolated recovery environment and used to create a recovery instance of the backup application. The system may also perform various tests on the recovered instance of the backup application in response to particular security threats before being exposed to a production system for recovery purposes.

20 Claims, 5 Drawing Sheets

SYSTEM FOR SECURELY RECOVERING BACKUP AND DATA PROTECTION INFRASTRUCTURE

TECHNICAL FIELD

This disclosure relates to recovering backup and data protection infrastructure, and more particularly, leveraging a secure environment to recovery backup system components in response to various cyber security threats.

BACKGROUND

A data backup and recovery system may provide various tools that are crucial for enterprise level network clients. Clients may rely on such systems to efficiently back up and recover data in the event of user error, data loss, system outages, hardware failure, or other catastrophic events to allow business applications to remain in service or quickly come back up to service. As with all computing systems, backup and recovery systems must be concerned with various cyber security threats which may threaten production backup environments. For example, cyber security threats often rely on various attack vectors to target critical data and software. An attack vector may include a path or means by which a malicious party (e.g. hacker) can gain access to a computer or network and deliver a payload that exploits system vulnerabilities. Once exploited, a production backup environment may be venerable to various types of cyber-attacks such as malware or ransomware. Such cyber-attacks may even target the data protection infrastructure itself, for example, by compromising backup and recovery software. Compromising the backup and recovery infrastructure itself, often results in a lengthy manual recovery procedure, or in some instances, a complete inability to recover critical backup data. Indeed, current products exist that attempt to protect against a range of cyber security threats. However, these products (or systems) often rely on highly connected components that do not adequately reduce the breath of potential attack vectors. In addition, these products often rely on security features built into components that reside on the production side of a network. Accordingly, there is a continued need to provide recovery mechanisms for backup and recovery systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
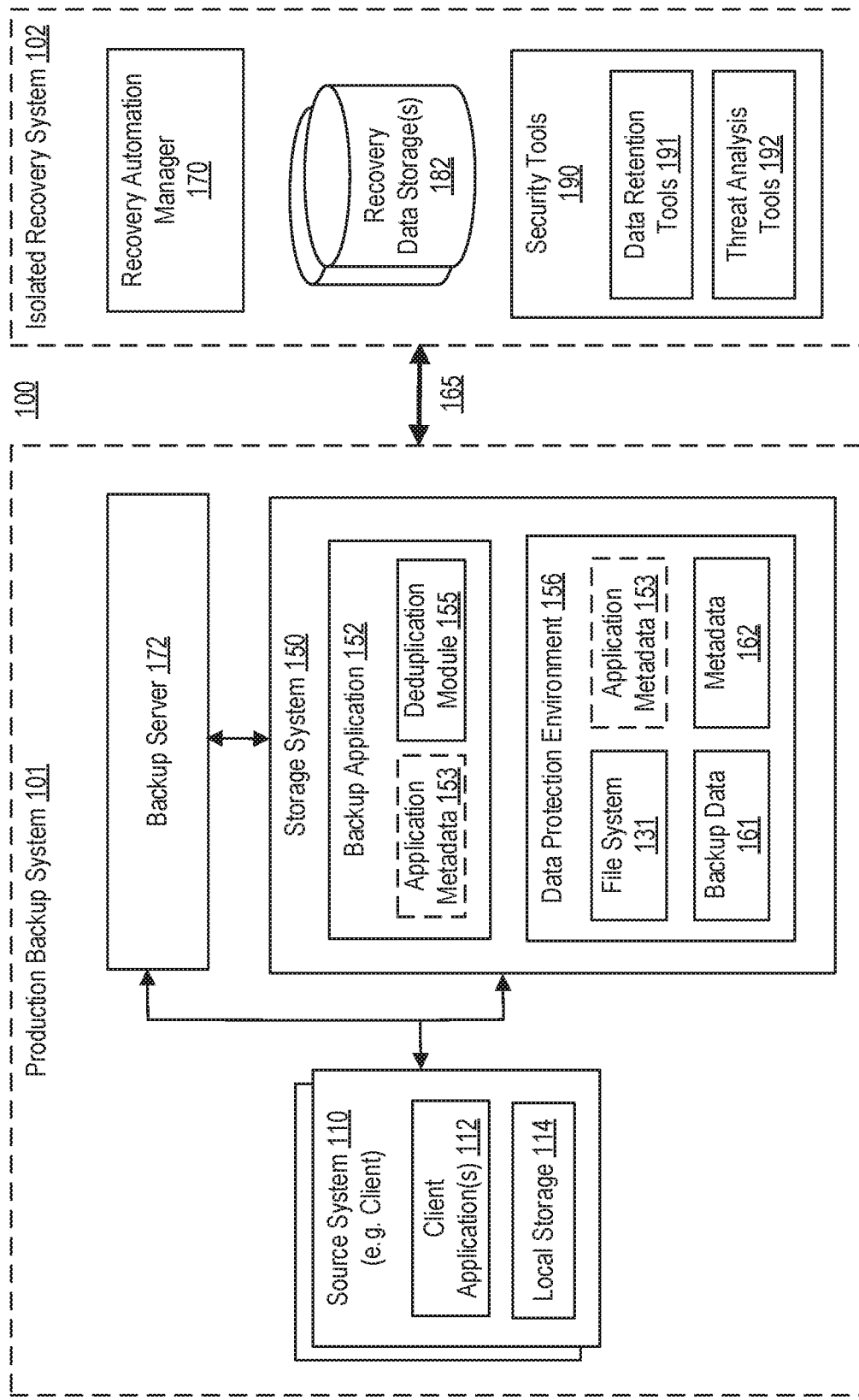
FIG. 1 is a block diagram illustrating an example of an operating environment for recovering backup and data protection infrastructure according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that provides a mechanism for securely recovering backup and data protection infrastructure. For example, the system provides the ability to recovery critical components such as a backup application that manages data for a production data backup and recovery system. Such a capability may be provided by securely storing a copy of metadata (e.g. application metadata) associated with a production backup application into an isolated recovery environment (or dark site, cyber-recovery vault, etc.). Accordingly, a copy of the metadata may be stored separately from the production environment, and thus, secure from potential security threats such as ransomware that may attack the production infrastructure itself. The secure copy of metadata may then be used to create a recovery instance of the backup application within the isolated recovery environment. Accordingly, the system may reduce the breadth of potential cyber security attack vectors and provide a secure mechanism for efficiently recovering a critical backup application. In addition, the system may automate such a procedure from a secured automation component within the isolated system. By utilizing the automation component of the secure and isolated environment, a security threat cannot access the automation component even if the threat is aware of such a component.

To provide such capabilities, the system may implement a secure process to recover backup and data protection infrastructure. In some embodiments, the system may transfer application metadata associated with critical components (e.g. backup application) of a production backup system to an isolated recovery system. In addition, the system may apply a retention lock to maintain a set of immutable copies of the recovery application metadata. When a security threat is encountered, a secure process to recover the backup application may be initiated by the isolated recovery system, which is external to the production system and secure from the security threat. The process may include the isolated recovery system restoring the application metadata to a sandboxed environment, and using the restored application metadata to create recovery instance of the backup application. If necessary, the system may performing various tests to ensure the instance of the backup application has not already been comprised by various security threats, or potentially susceptible to such security threats. The system may then expose data associated with the recovered instance of the backup application (or restored application metadata) to the production backup system. For example, the isolated recovery system may provide recovery data to the production backup system to recovery a production backup application and/or a production data protection storage that may have been compromised to the a security breach such as ransomware.

Accordingly, in some embodiments, described is a mechanism that minimizes the breath of potential attack vectors to backup and data protection infrastructure and provides a secure process for recovering critical components of a production backup system.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a storage environment including primary storage and data protection storage. For example, at least some functionality may be provided by, or implemented in connection with, various platforms such as the Dell/EMC Data Domain™ data protection platform, and associated systems, methods, and components, although use of this particular platform is provided only by way of illustration and is not required.

In one embodiment, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

More specifically, and with reference to FIG. 1, shown is a block diagram illustrating an example of an operating environment 100 for recovering backup and data protection infrastructure according to one or more embodiments of the disclosure. As shown, the environment 100 may include a production backup system 101 and an isolated recovery system 102. The production backup system 101 may include components that are live and/or used for providing services by the customer (or client) of a backup and data protection service (or storage service). For example, the production backup system 101 may include a source system 110 that provides computing resources (e.g. webservers, databases, etc.) for users (e.g. website visitors) of the customer of the backup and data protection service. It should be noted that the components of operating environment 100 may interact via a network, which may be any type of wired or wireless network including a local area network (LAN), a wide area network (WAN), or a direct communication link, or other suitable connection. In some embodiments, the production backup system 101 may be connected to the isolated recovery system 102 via a data connection 165 which may be intelligently activated or deactivated. For example, to minimize the breadth of potential attack vectors, components of the production backup system 101 (e.g. storage system 150, backup server 172, etc.) may only be allowed access to the isolated recovery system 102 during the window of time that the data connection is activated. The data connection 165 may be any suitable wired or wireless network (or data) connection. In some embodiments, the data connection 165 may be a particular network port such as a replication port. In addition, the data connection 165 may be the only data connection between the two systems.

As shown, the operating environment 100 may include a client or source system (or computer, or device) 110 that may be associated with a customer of a service and a storage system 150 that may be associated with a service provider. In some embodiments, the source system 110 may act as a client from which backups are performed. In some embodiments, the source system 110 may comprise a virtual machine. The source system (or computer, device, etc.) 110 may host one or more client applications 112, and may include local storage 114, as well as an interface for communicating with other systems and devices, such as the storage system 150. In general, the client applications 112 may create new and/or modified data that is desired to be protected. As such, the source system 110 is an example of a host device. The local storage 114 can be used to locally store data, which may, along with the source system 110 itself be backed up using the storage system 150. The backed-up data can be restored to the local storage 114. The source system 110 may include a backup client application that cooperates with storage system 150, to create backups of client data, which may include backup data 161. As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc.

In one embodiment, storage system 150 may represent one or more components of a Data Domain™ Restorer (DDR)-based deduplication storage system, and backup server 172 may be implemented in conjunction with a Data Domain deduplication storage server provided by Dell/ EMC™ Corporation for use with DDR storage devices. For example, the backup server 172 may be a stand-alone entity, or can be an element of the environment 100. In some embodiments, the backup server 172 may be an EMC Corp. Avamar server or an EMC Corp. Networker server, although no particular server is required, and other backup and storage system configurations are contemplated.

The storage system 150, may include a backup application 152 that performs (or manages, coordinates, etc.) the creation and restoration of critical data that may be backed-up. This data may include backup data of the source system 110, as well as critical data used by components of the production backup system. For example, data to be backed-up from the source system 110 may be communicated from the source system 110 to the backup application 152 for initial processing, after which the processed data is uploaded from the backup application 152 for storage at the data protection environment 156 (e.g. as backup data 161). In some embodiments, the backup application 152 may cooperate with a backup client application of the source system 110 to back up client data to the data protection environment 156. A backup application 152 may also cooperate with a backup client application to restore backup data from the data protection environment 156 to the source system 110. In some embodiments, the storage application 152 may be a part of, or work in conjunction with, a storage appliance. For example, the storage appliance may include a Dell-EMC CloudBoost appliance, although any suitable appliance is contemplated. In addition, the storage application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the data protection environment 156.

The production backup system 101 may also store application metadata (or backup application data, or metadata) 153. The application metadata 153 may include data or metadata that is maintained by the production backup system 101 and associated with the backup application 152, or other backup and data protection components (or infrastructure) such as the backup server 172, or other components of the storage system 150. The application metadata 153 may include critical information (e.g. files) such as a backup catalog, configuration settings, profiles, attributes (e.g. last backup time, backup schedule, data to-be-backed-up, etc.), or any other information relied upon by the backup application 152 (or other backup and data protection components) to perform a backup or recover procedure. For example, the application metadata 153 may allow the backup application 152 to be restored (or recovered) to a current (e.g. up-to-date) operational state in the event the backup application 152 requires recovery. In some embodiments, the application metadata 153 may be stored within the data protection environment 156 as part of backup data 161 and/or metadata 162. For example, the application metadata 153 may be stored in a particular container within the backup data 161 and/or metadata 162 within a protected environment to provide production-side recovery capability.

The data protection environment (or storage) 156 may store metadata 162 for the backup data 161, which may include a backup of the application metadata 153, and one or more instances of a filesystem 131 that catalogs files and other data residing in the data protection environment 156. In general, the storage of backup data 161 may be configured to store source system 110 data backups that can be restored in the event of a loss of data. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated. The storage of data can employ any suitable storage technique, infrastructure, hardware (e.g. Solid State Drive (SSD), Hard Disk Drive (HDD)), or on virtual storage systems provided by a cloud service provider etc.

The isolated recovery system 102 may include an isolated and/or secure environment that is separate from the production backup system 101. In some embodiments, the isolated recovery system 102 may be part of one or more physical servers that are provided as part of a cloud-computing service that is provided by a different entity than the entity that provides the production backup system 101. For example, the production environment 101 may be provided as part of Dell/EMC Data Domain™ data protection platform and the isolated recovery system 102 may be provided by a different entity (e.g. Amazon Web Services (AWS) platform, Microsoft Azure platform, etc.). Accordingly, in some embodiments, the isolated recovery system 102 may be provided as part of a user-account managed by the different entity (e.g. Amazon, Microsoft, etc.). Accordingly, the system described herein may provide the customer with the ability to efficiently and seamlessly interact with the different entity that provides the on-demand infrastructure (e.g. Infrastructure as a Service (IaaS)) for the isolated recovery system 102.

The isolated recovery system 102 may include one or more recovery data storage(s) 182. The recovery data storage (or recovery data protection storage) 182 may store data (or recovery data) used to recover the data protection environment 156 such as the backup data 161 and metadata 162. In addition, the recovery data storage 182 may store copies (e.g. corresponding to various restore points) of the application metadata 153 to be used to recover components of the backup and data protection infrastructure of the production backup system 101 such as the backup application 152 itself, the backup server 172, or other components of the storage system 150. For example, the backup and data protection infrastructure may include components that manage the data protection environment 156, and/or provide the ability to backup and recover data. For example, a security threat may infiltrate, or attempt to infiltrate, production-side application metadata 153 to disrupt the security and/or function of the backup application 152 itself. As a result, the application metadata 153 may be stored as part of the recovery data (e.g. within the recovery data storage 182) that may be recovered within a secure environment as further described herein. In some embodiments, the backup and data protection infrastructure of the production backup system 101 may include components that if compromised (e.g. disabled or otherwise unavailable for use), may prevent the production backup system 101 from performing a recovery procedure. For example, a security threat may not only be aimed at attacking the backup application 152, but also the data protection environment 156 that may store data used to by the production backup system 101 to recover the backup application 152 (or other components) in response to the security threat.

The recovery automation manager 170 may coordinate (or manage, orchestrate, automate, etc.) a workflow (or process) for performing a recovery process for the backup and data protection infrastructure of the production backup system 101 such as the backup application 152 as further described herein. In some embodiments, the recovery automation manager 170 may perform such a process according to a predefined security policy. For example, the recovery automation manager 170 may determine when recovery of data is necessary, perform recovery data synchronization, perform data connection management (activating/deactivating replication ports), restore recovery data, access various security tools, perform testing and verification of recovery data, and/or restore (or expose) recovery components to the production backup system 101. As shown, the recovery automation manager 170 may itself be contained within a secure environment (e.g. the isolated recovery system 102), and accordingly, a security threat cannot access the recovery automation manager 170 even if it is aware of such a component. Accordingly, in some embodiments, recovery processes as further described herein may be performed in a secure and automated manner by having the coordination managed by a single secure component.

In addition, the isolated recovery system 102 may include various security tools 190. These tools may include various software components, APIs, libraries, classes, etc. to implement additional security features or capabilities within the isolated system. For example, the isolated recovery system 102 may include data retention tools 191. These retention tools 191 may ensure that immutable copies of recovery data remain persistent for a predetermined amount of time. For example, the data retention tools 191 may ensure that all the data (e.g. files) that are locked for a time-based retention period cannot be deleted or overwritten under any circumstances until the retention period expires. To provide such capabilities, the tools may implement various features or policies such as requiring dual sign-on procedures for certain administrative actions. For example, a dual sign-on (or verification) procedure may require a regular system administrator sign-on (or verification) plus a second authorized person (e.g. a "Security Officer") to perform certain administrative operations associated with the locked recovery data. The dual sign-on requirement may ensure that certain administrative actions are under the purview and control of a higher authority above and beyond the system administrator. In addition, the retention tools 191 may also implement various other policies such as disallowing operations that could compromise the state of locked data, securing the system clock from illegal updates, audit logging for any operations that are executed upon the locked data, disabling various "doors" of access that could compromise the state of the locked data or the state of the retention attributes, or other security policies. In some embodiments, the data retention tools 101 may include Dell EMC Data Domain Retention Lock® (DD Retention Lock) components, although any suitable set of tools are contemplated. In some embodiments, retention tools 191 may be compatible with various industry-standards, such as NAS-based (CIFS, NFS) Write-Once-Read-Many (WORM) protocols.

The security tools 190 may also include security threat analysis tools 192. These tools may determine or predict potential security threats to various components of the system. For example, the analysis tools 192 may include various artificial intelligence (AI) tools and/or machine learning components to analyze various statistics and/or behavior within the system to assess the likelihood of any potential security threats. For example, the isolated recover system 102 may even proactively initiate performing a recovery process of a backup application 152 as further described herein in response to determining the production backup system 101 may be exposed to a potential security threat.

Accordingly, the isolated recovery system 102 may provide a secure environment for creating recovery instances of critical backup and data protection components as further described with reference to FIG. 2.

Figure 2:
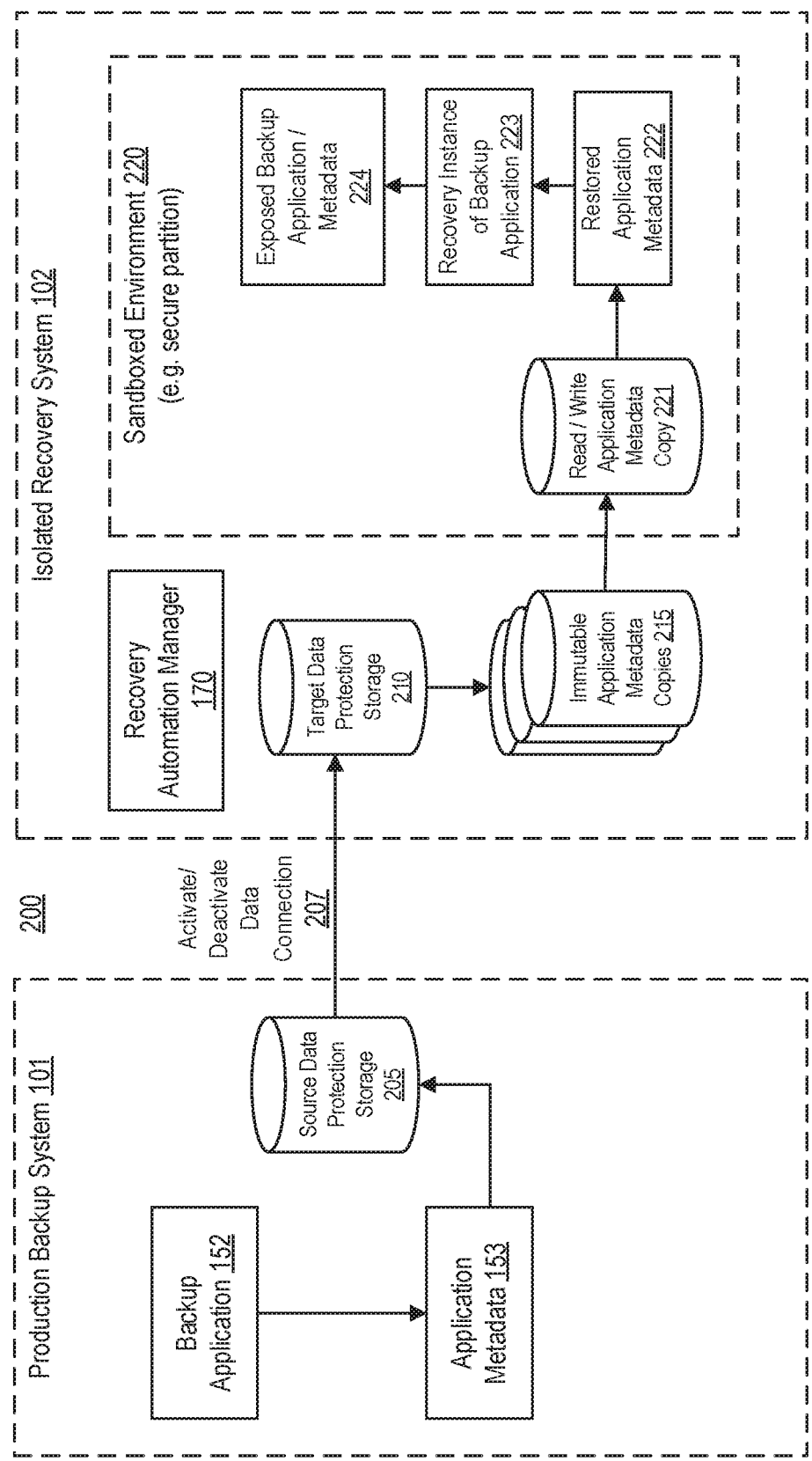
FIG. 2 is a block diagram illustrating an example interaction between components for performing a process to recover data within a secure environment according to one or more embodiments of the disclosure.

FIG. 2 is a block diagram 200 illustrating an example interaction between components for performing a process to recover data within a secure environment according to one or more embodiments of the disclosure. As shown, the backup application 152 may be associated with application metadata 153. For example, the production backup system 101 may maintain application metadata 153 that is stored in a manner for it to be backed-up and/or recovered by the production backup system 101. Accordingly, the application metadata 153 (or a copy thereof) may be stored within a source data protection storage 205. For example, the source data protection storage 205 may be part of the data protection environment 156 as described above. As described, the application metadata 153 may be recovered in instances where the backup application 152 and/or the data protection environment 156 (e.g. source data protection storage 205) are compromised by a security threat. Accordingly, a copy of the application metadata 153 may also be stored by the isolated recovery system 102. As shown, the application metadata 153 stored by the source data protection storage 205 may be transferred to the target data protection storage 210 of the isolated recovery system 102. The transfer of data may be performed in a secure manner (e.g. by encrypting the data).

As described, application metadata 153 stored by the source data protection storage 250 and the target data protection storage 210 may be synchronized. For example, the isolated recovery system 102 (e.g. via the recovery automation manager 170) may determine whether synchronization is required based on several criteria. In some embodiments, the recovery automation manager 170 may initiate the synchronization based on a predefined schedule to ensure the recovery data is up-to-date. In some embodiments, the synchronization (e.g. based on a schedule) may be adjusted (e.g. enabled/disabled) based on the potential of a security threat. For example, the recovery automation manager 170 may receive an indication that the production backup system 101 may be exposed to a security threat, and in response, may forgo (or disable, skip, prevent, etc.) the synchronization to avoid potential exposure of the isolated recovery system 102 to the security threat. Accordingly, the isolated recovery system 102 may activate/deactivate the data connection 207 to the production backup system 101. For example, the recovery automation manager 170 may activate (or enable, open, allow access, etc.) a data connection (e.g. data connection 165) between the production backup system 101 and the isolated recovery system 102. To minimize the breadth of potential attack vectors, components of the production backup system 101 (e.g. storage system 150, backup server 172, etc.) may only be allowed access to the isolated recovery system 102 during the window of time that the data connection is activated. In addition, the recovery automation manager 170 may determine when the synchronization is complete, and in response, may deactivate (or disable, close, deny access, etc.) the data connection. For example, the data connection may be immediately deactivated upon completion of the transfer of data. In some embodiments, the data connection may be the only access path to the isolated recovery system 102 from the production backup system 101. Moreover, the data connection may be the only access point for any external system to the isolated recovery system 102. Accordingly, in some embodiments, deactivating the data connection can effectively close all access paths to the isolated recovery system 102, and thereby effectively avoid potential attack vectors that may originate from an external system.

As shown, the isolated recovery system 102 may store various versions of the application metadata 153 as part of a set of immutable application metadata copies 215. In some embodiments, the isolated recovery system 102 may apply a retention lock to create the set of immutable application metadata copies 215. In some embodiments, recovery automation manager 170 may manage and/or apply such a retention lock. Accordingly, immutable copies of the recovery backup data and recovery application data may be preserved for a predetermined amount of time. In some embodiments, each of the immutable application metadata copies (or instances) 153 may correspond to a particular restore point based on the time in which the application metadata was created. For example, multiple instances (or versions) of the application metadata 153 may be created corresponding to a backup schedule (e.g. hourly, daily, etc.). Accordingly, the isolated recovery system 102 may store corresponding instances (e.g. hourly, daily, etc.) of the application metadata 153 that are created or maintained according to a synchronization schedule. In some embodiments, the isolated recovery system 102 may store instances at different time points. For example, the production backup system 101 may include instances of the application metadata 153 that are backed up on an hourly schedule, and the isolated recovery system 102 may include instances (or copies) of the application metadata 153 that are backed up on daily schedule. In some embodiments, synchronizing the application metadata stored by the isolated recovery system 102 may include creating a new copy of the metadata. In addition, copies of the application metadata 153 may be stored in an efficient manner (e.g. deduplicated) by storing only the differences between instances, and accordingly, may also be associated with its own metadata.

To provide an additional layer of security, the system may perform the recovery process within a sandboxed environment 220. In some embodiments, the sandboxed (or virtual sandbox) environment 220 may include a secure partition within the isolated recovery system 102. In general, a sandboxed (or isolated, secure, restricted, test, etc.) environment may provide a security mechanism for isolating data or applications and thereby limiting risk to a host machine or operating system. For example, the sandbox may provide a tightly controlled set of resources and restrict access to memory, network, kernel procedures, and other components of the isolated recovery system 102. Accordingly, the sandboxed environment 220 may be used to test unverified recovery data (e.g. application metadata) that may have been exposed to security threats such as viruses, ransomware, or other malicious code.

As described, the isolated recovery system 102 may include a recovery automation manager 170 that coordinates a recovery process. For example, the recovery automation manager 170 may initiate a process to restore data that may be used to recovery components of the production system 101. As described, the recovery automation manager 170 may itself be contained within a secure environment (e.g. separate from the production environment), and therefore, secure from any malicious code that may have infiltrated production backup system 101. As described, the recovery automation manager 170 may automate various operations performed with in the isolated recovery system 102 and thereby may improve the overall efficiency and security of the recovery process.

As part of a recovery process, the isolated recovery system 102 (e.g. via the recovery automation manager 170) may first create a read/write application metadata copy 221. Accordingly, the system may use the readable/writeable application metadata create restored application metadata 222. For example, the application metadata may be restored within the sandboxed environment 220. In some embodiments, restoring data (e.g. application metadata) may include rehydrating the data that may be stored in an efficient manner. For example, rehydrating data may include performing processes to reverse various procedures implemented to store recovery data. For instance, when initially storing recovery data, the recovery data may be compressed, deduplicated, and/or encrypted. Accordingly, rehydrating data may include reversing such a process to restore the data (e.g. application metadata) to a usable state. For example, the restored application metadata 152 may include usable data (e.g. rehydrated application metadata) that may be tested and/or verified before being used to create (install, recovery, restore, etc.) the recovery instance of the backup application 223. In some embodiments, the restored application metadata 222 may include the original application metadata (e.g. combinations of a backup catalog, configuration files, etc.) stored by the production backup system 101 and associated with the backup application 152.

The restored application metadata 222 may be used to create one or more recovery instances (or versions, copies, etc.) of the backup application 223. For example, the recovery instance of the backup application 223 may be a recreation of the backup application 152 utilized by the production backup system 101. Accordingly, the recovery instance of the backup application 223 may be verified and/or tested within the secure environment 200 as if it were executing (or installed) in the production environment. For example, the isolated recovery system 102 may create a virtualization of the production backup system 101. In addition, the restored application metadata (e.g. particular configuration settings) may be used to recreate the particular (e.g. specialized, customized, etc.) version of the backup application 152 (e.g. as the recovery instance 223) that may be associated with a particular user account (or customer, client, etc.) of a data backup and recovery service provided, at least in part, by the production backup system 101.

In some embodiments, the restored application metadata 222 may be used in conjunction with installation files to create a recovery instance of the backup application 223. For example, the isolated recovery system 102 may store secure installation files (or data) of the backup application (e.g. backup application 152). In some embodiments, the data or installation files may be obtained from an external source such as from the backup application provider. For example, in some embodiments, a generic (or "off-the-shelf") version of the backup application 152 may be installed from the installation files and the restored application metadata 222 may be used (e.g. as part of, or after, the installation process) to create the recovery instance of the backup application 223.

In some embodiments, a particular version (or instance, copy, etc.) of the restored application metadata 222 may be restored based on a restore point (or time point) associated with a security threat. For example, if a security breach (e.g. successful injection of malicious code to the production backup system 101) occurred at time X, the copy of the application metadata selected from the set of immutable application metadata copies 215 may correspond to a time point prior to time X. As another example, the copy of the application metadata selected may correspond to a time point after time X. For instance, a backup application may be recovered using application metadata that was synchronized after time point X, and accordingly, the system may perform various tests or apply patches to the application metadata and address the particular security breach (e.g. malicious code).

In some embodiments, the recovery instance of the backup application 223 may also be tested and/or verified before being exposed (or provided, deployed, transferred, made available/accessible, etc.) to the production backup system 101. For example, the system may perform various tests or verifications to ensure that the restored application metadata 222 or recovery instance of the backup application 223 have not already been comprised by various security threats, or potentially susceptible to such threats.

Accordingly, data to recover the backup application 152 and/or source data protection storage 205 may be exposed to the production backup system 102. In some embodiments, the exposed backup application/metadata 224 may include allowing a user (e.g. administrator with sufficient security credentials) to access the restored data and to initiate a recovery process for components of the production backup system 101. The exposed data may include the recovery instance of backup application 223 itself, the restored application metadata 222, other related data, or combinations thereof. Accordingly, an isolated recovery environment may be leveraged to securely recover backup and data protection components of a production environment as further described with reference to FIG. 3.

Figure 3:
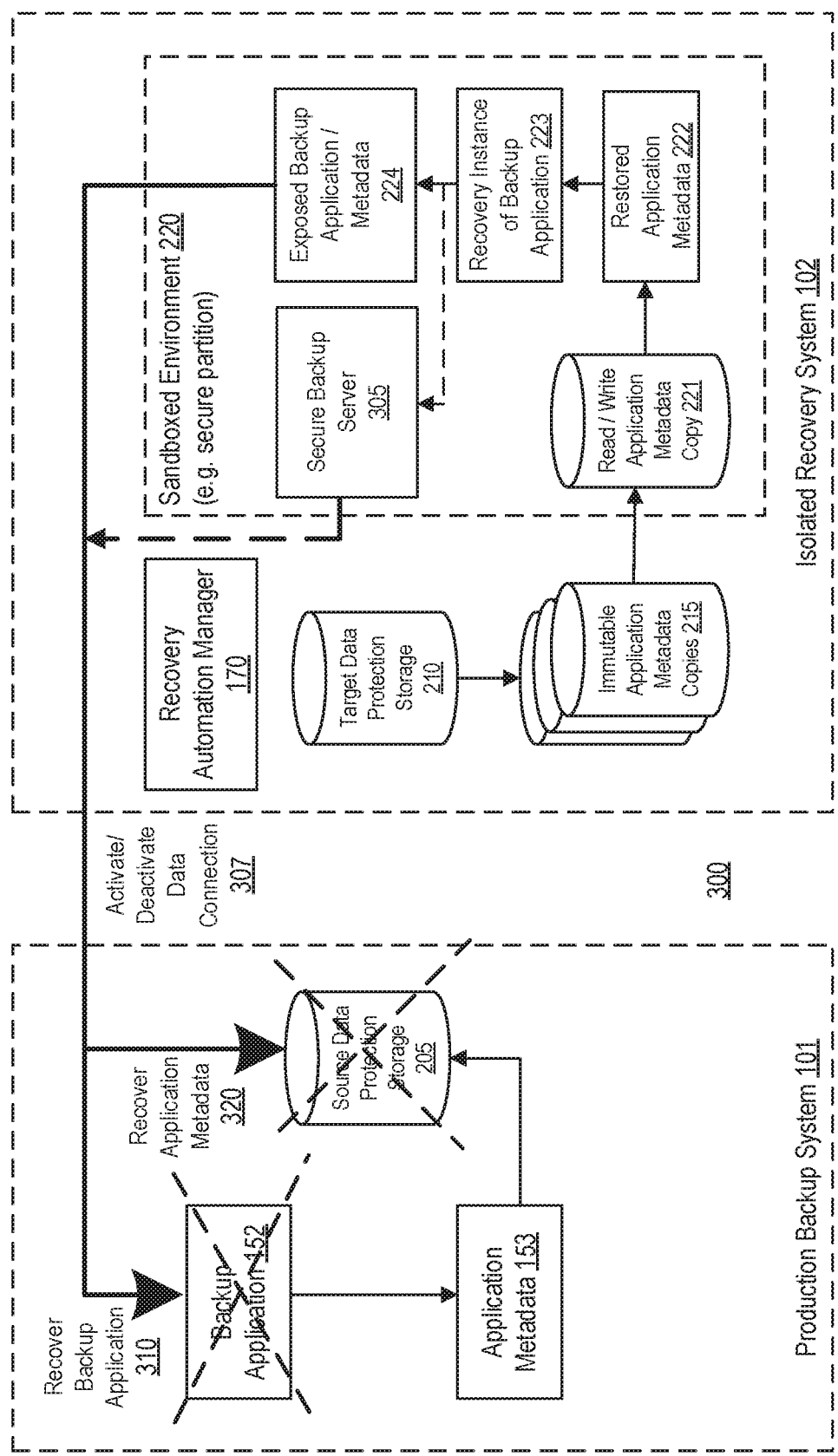
FIG. 3 is a block diagram illustrating an example interaction between components for recovering backup and data protection infrastructure of a production environment according to one or more embodiments of the disclosure.

FIG. 3 is a block diagram 300 illustrating an example interaction between components for recovering backup and data protection infrastructure of a production environment according to one or more embodiments of the disclosure. As described, the isolated recovery system 102 may expose the backup application (e.g. recovery instance of the backup application 223), and/or the application metadata (e.g. application metadata 222) to the production backup system 101 to recover backup and data protection infrastructure in response to various security threats. This may include transferring recovery data to the production backup system 101 via data connection (e.g. data connection 165). In some embodiments, the data connection may include the same data connection used to receive application metadata by the isolated recovery system 102. In addition, to provide an additional layer of security, the isolated recovery system 102 may activate/deactivate the data connection 307. For example, the recovery automation manager 170 may activate the data connection to provide such data and deactivate (or immediately deactivate) the data connection once the transfer is complete.

Once the recovery data is received by the production backup system 101, various backup and data protection infrastructure components may be recovered. For example, a security threat (or security breach) may include a cyberattack such as a virus or other types of malicious code threat may render components of the production backup system unusable (e.g. unavailable, disabled, encrypted, etc.). For example, in response to a security threat, an administrator (or the system automatically) may disable various components of the production backup system 101 to prevent additional components from being compromised. In another scenario, the security threat itself, such as ransomware, may render components of the production backup system 101 unusable. For example, the ransomware may encrypt data associated with infrastructure components and demand payment to obtain the required keys to decrypt such data, or otherwise allow such components to be used again. In such instances, even if components such as the backup application 152 are reinstalled, application metadata 153 may not be available, and thus, the backup application 152 may not be able to perform operations in a manner prior to the security breach. For example, the ransomware may have compromised the source data protection storage 205. Accordingly, in response to the backup application 152 being unusable (e.g. as shown being marked with an "X"), the isolated recovery system 102 may recover the backup application 310. In addition to, or as an alternative to recovering the backup application 152, in response to source data protection storage 205 being unusable, the isolated recovery system 102 may recover the application metadata 320.

In some embodiments, the isolated recovery system 102 may include a secure backup server (or system) 305 to implement (or instantiate) components of the production backup system 101 within a secure environment as part of a recovery process. For example, the secure backup server 305 may implement the backup server 172, the backup application 152, storage system 150, or a combination thereof, of the production backup system 101 to recover components directly from the isolated recovery system 102. As shown, in some embodiments, the secure backup server 305 may be contained within the sandboxed environment 220 (or instance of the sandboxed environment 220). Accordingly, the recovery instance of the backup application 223 and/or the restored application metadata 222 may be provided (or exposed) to the secure backup server 305 during recovery. For example, the backup application 152 on the production backup system 101 may be recovered directly from the secure backup server 305 during a recovery process to avoid potential exposure (or reexposure) to a security threat that has infiltrated the production backup system 101. In addition, the source data protection storage 205, application metadata 153, or other components of the production backup system 101, may be recovered directly from the secure backup server 305.

Accordingly, the isolated recovery system 102 may initiate a recovery in instances where critical data required to recover components of the production backup system 101 itself are compromised. Moreover, as shown, the isolated recovery system 102, which is a system external to the production backup system 101, may initiate and perform a recovery process of components of the production backup system 101. In other words, the isolated recovery system 102 provides a mechanism not available in previous backup and data protection configurations in that the data and the management of such a recovery process may be performed by an external system. In addition, one or more operations described of diagrams 200 and 300 may be performed by, or initiated by, the recovery automation manager 170. Accordingly, the recovery process and infrastructure may be managed in a secure and automated manner by having the coordination managed by a single secure component. Accordingly, the system may minimize the breath of potential attack vectors to backup and data protection assets within a production environment.

Figure 4:
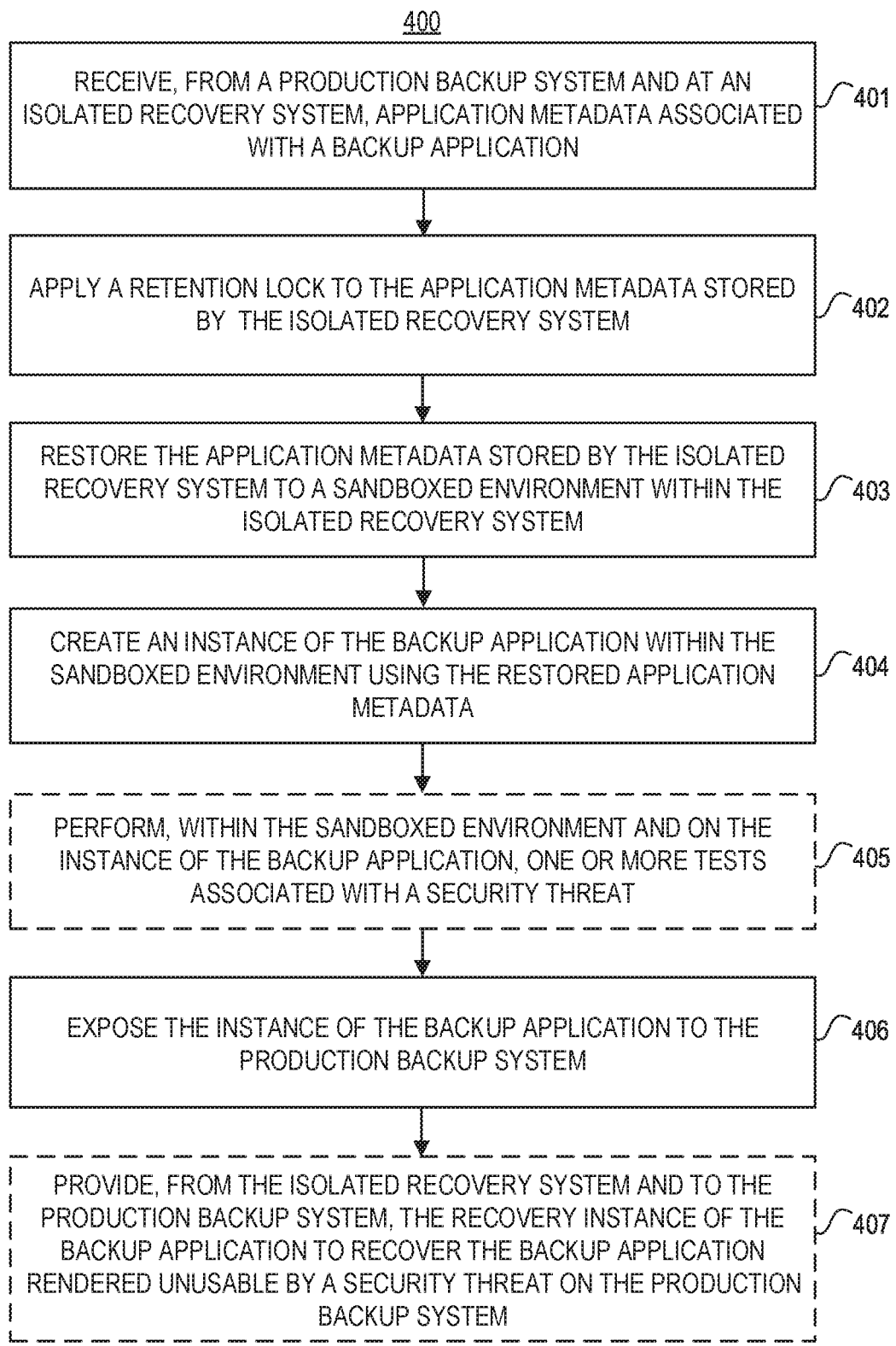
FIG. 4 is a flow diagram illustrating an example method of securely recovering components of a production backup system according to one or more embodiments of the disclosure.

FIG. 4 is a flow diagram 400 illustrating an example method of securely recovering components of a production backup system according to one or more embodiments of the disclosure. Process 400 may use processing logic, which may include software, hardware, or a combination thereof. For example, process 400 may be performed by a system including one or more components described in operating environment 100 (e.g. automation manager 170, isolated recovery system 102, etc.).

As described, the system may initiate a transfer of data from the production backup system to the isolated recovery system that synchronizes recovery data used to recover components of the production backup system. Accordingly, in 401, the system may receive, from a source data protection storage (e.g. source data protection storage 205) of a production backup system (e.g. production backup system 101) and at a target data protection storage (e.g. target data protection storage 210) of an isolated recovery system (isolated recovery system 102), application metadata (e.g. application metadata 153) associated with a backup application (e.g. backup application 152). As described, the backup application may perform backup operations associated with the production backup system. For example, the backup application may manage the creation of backup data (e.g. backup data 161) created as part of the production backup system. Accordingly, the production backup system may maintain application metadata for the backup application. In some embodiments, the application metadata may include a backup catalog that is relied upon by the backup application to recover components of the production backup system. For example, the backup catalog may include information required for a backup application to correctly perform backup, management, and/or recovery operations.

In some embodiments, the system may perform an intelligent activation/deactivation of a data connection between the production backup system and the isolated recovery system. For example, the system may activate a data connection between the production backup system and the isolated recovery system. Once the data connection is activated, the system may initiate a transfer of data that synchronizes the application metadata (or copy thereof) stored by the target data protection storage with a version (or copy) of the application metadata stored by the source data protection storage. In response to determining the synchronization is complete, the system may deactivate the data connection between the production backup system and the isolated recovery system. Accordingly, the deactivation may prevent access to the isolated recovery system from the production environment. For example, the system may deactivate the data connection in response to determining a synchronization of recovery application metadata is complete.

As described, the isolated recovery system may store recovery application metadata comprising a copy of the application metadata stored by the production backup system. For example, the recovery application metadata stored by the isolated recovery system and the application metadata stored by the production backup system may be synchronized. In some embodiments, the application metadata stored by the target data protection storage may be stored as part of a set of application metadata copies that correspond to a set of backup application restore time points.

In 402, the system may apply a retention lock to the application metadata stored by the target data protection storage of the isolated recovery system. For example, the system may apply a retention lock to one or more copies of the application metadata (e.g. that correspond to various restore points) to create immutable application metadata copies (e.g. immutable application metadata copies 215). The retention lock may ensure the recovery application metadata persists for a predetermined time (or retention time). In some embodiments, applying the retention lock may include requiring a dual sign-on or verification procedure to perform administrative operations associated with the locked recovery application metadata. For example, a dual sign-on (or verification) procedure may require a regular system administrator sign-on (or verification) plus a second authorized person (e.g. a "Security Officer") to perform certain administrative operations associated with the locked recovery data. Accordingly, the dual sign-on requirement may ensure that certain administrative actions are under the purview and control of a higher authority above and beyond the system administrator.

In 403, the system may restore the application metadata stored by the target data protection storage to a sandboxed environment (e.g. sandboxed environment 220) within the isolated recovery system. In some embodiments, the system may restore the application metadata in response to an indication to recover the backup application. In some embodiments, the indication to recovery the backup application may include a detection of a security threat. For example, a user (or component) may indicate that the production backup system 101 is exposed or compromised by a security threat. In response, the recovery automation manager 170 may initiate a restore process.

In 404, the system may create an instance of the backup application (or recovery instance of the backup application) within the sandboxed environment using the restored application metadata. In some embodiments, the sandboxed environment may include at least a secure partition within the isolated recovery system.

In 405, the system may perform, within the sandboxed environment and on the instance of the backup application, one or more tests associated with a security threat. In some embodiments, the system may receive, from the production backup system, an indication of a security threat, and accordingly, the system may perform specific tests in response to a particular security threat. In some embodiments, recovering the instance of the backup application may include installing the instance of the backup application within the sandboxed environment using the restored application metadata.

In 406, the system may expose the instance of the backup application to the production backup system. In some embodiments, exposing the instance of the backup application to the production backup system may include allowing a user (e.g. administrator with sufficient security credentials) to access the restored data and to initiate a recovery process for components of the production backup system. For example, the exposed data may include the recovery instance of backup application itself, the restored application metadata, other related data, or combinations thereof.

In 407, the system may provide, from the isolated recovery system and to the production backup system, the recovery instance of the backup application to recover the backup application that has been rendered unusable by a security threat on the production backup system. In addition, in some embodiments, the system may provide, from the isolated recovery system and to the production backup system, the restored application metadata to recover the application metadata that has been rendered unusable by a security threat on the production backup system. For example, a security threat such as ransomware that has compromised the production backup system may encrypt data of the production backup system rendering the backup application and/or application metadata unusable. In some embodiments, the recovery instance of the backup application and/or the restored application metadata for recovering components that have been rendered unusable on the production backup system may be provided from a secure backup server (e.g. secure backup server 305) within the isolated recovery system 102. For example, the backup application 152 on the production backup system 101 may be recovered directly from the secure backup server during a recovery process to avoid potential exposure (or reexposure) to a security threat that has infiltrated the production backup system 101.

Accordingly, in some embodiments, the method may minimize the breath of potential attack vectors to backup and data protection infrastructure and provide a secure process for recovering critical data for various components of a production backup system from an external source.

Figure 5:
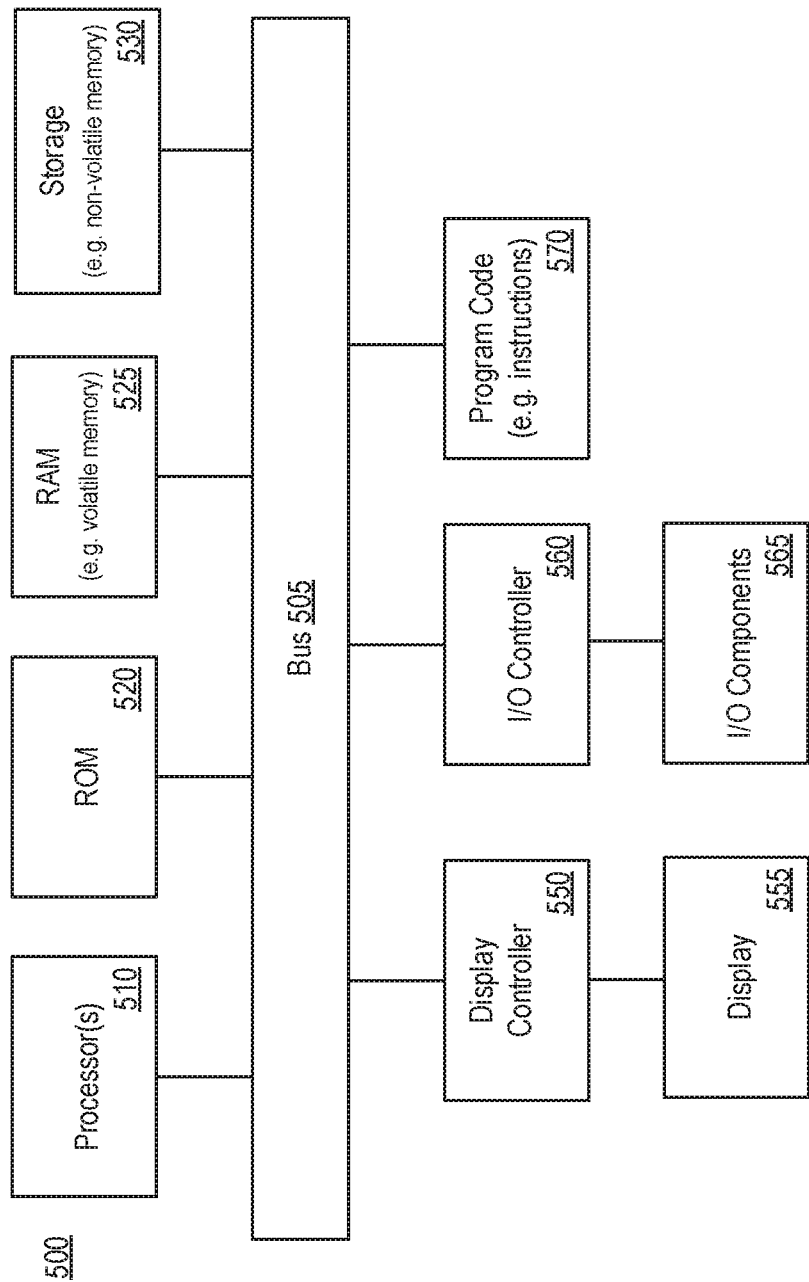
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. recovery automation manager 170, isolated recovery system 102, storage system 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. recovery automation manager 170). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   receive, from a source data protection storage of a production backup system and at a target data protection storage of an isolated recovery system, application metadata associated with a backup application, the backup application performing backup operations associated with the production backup system, the isolated recovery system being isolated from the production backup system;
   apply a retention lock to the application metadata stored by the target data protection storage of the isolated recovery system, the application of retention lock causing a set of immutable application metadata copies to be created and persistent for a predefined time period;

restore the application metadata stored by the target data protection storage to a sandboxed environment within the isolated recovery system;

create an instance of the backup application within the sandboxed environment within the isolated recovery system using the restored application metadata; and expose the instance of the backup application in the isolated recovery system to the production backup system.

2. The system of claim 1, wherein the plurality of instructions, when executed, further cause the one or more processors to:

receive, from the production backup system, an indication of a security threat; and perform, within the sandboxed environment and on the instance of the backup application, one or more tests associated with the security threat.

3. The system of claim 1, wherein the plurality of instructions, when executed, further cause the one or more processors to:

provide, from the isolated recovery system and to the production backup system, the recovery instance of the backup application to recover the backup application that has been rendered unusable by a security threat on the production backup system.

4. The system of claim 1, wherein the plurality of instructions, when executed, further cause the one or more processors to:

provide, from the isolated recovery system and to the production backup system, the restored application metadata to recover the application metadata that has been rendered unusable by a security threat on the production backup system.

5. The system of claim 1, wherein creating the instance of the backup application includes installing the backup application within the sandboxed environment using the restored application metadata.

6. The system of claim 1, wherein the plurality of instructions, when executed, further cause the one or more processors to:

activate a data connection between the production backup system and the isolated recovery system;

initiate a transfer of data, via the activated data connection and from the production backup system to the isolated recovery system, that synchronizes the application metadata stored by the target data protection storage with a version of the application metadata stored by the source data protection storage; and deactivate, in response to determining the synchronization is complete, the data connection between the production backup system and the isolated recovery system to prevent access to the isolated recovery system from the production environment.

7. The system of claim 1, wherein the application metadata includes a backup catalog that is relied upon by the backup application to recover components of the production backup system.

8. The system of claim 1, wherein the application metadata stored by the target data source is stored as part of a set of application metadata copies that correspond to a set of backup application restore time points.

9. A method comprising:

receiving, from a source data protection storage of a production backup system and at a target data protection storage of an isolated recovery system, application metadata associated with a backup application, the backup application performing backup operations associated with the production backup system, the isolated recovery system being isolated from the production backup system;

applying a retention lock to the application metadata stored by the target data protection storage of the isolated recovery system, the application of retention lock causing a set of immutable application metadata copies to be created and persistent for a predefined time period;

restoring the application metadata stored by the target data protection storage to a sandboxed environment within the isolated recovery system;

creating an instance of the backup application within the sandboxed environment within the isolated recovery system using the restored application metadata; and exposing the instance of the backup application in the isolated recovery system to the production backup system.

10. The method of claim 9, further comprising:

receiving, from the production backup system, an indication of a security threat; and performing, within the sandboxed environment and on the instance of the backup application, one or more tests associated with the security threat.

11. The method of claim 9, further comprising:

providing, from the isolated recovery system and to the production backup system, the recovery instance of the backup application to recover the backup application that has been rendered unusable by a security threat on the production backup system.

12. The method of claim 9, further comprising:

providing, from the isolated recovery system and to the production backup system, the restored application metadata to recover the application metadata that has been rendered unusable by a security threat on the production backup system.

13. The method of claim 9, wherein creating the instance of the backup application includes installing the backup application within the sandboxed environment using the restored application metadata.

14. The method of claim 9, further comprising:

activating a data connection between the production backup system and the isolated recovery system;

initiating a transfer of data, via the activated data connection and from the production backup system to the isolated recovery system, that synchronizes the application metadata stored by the target data protection storage with a version of the application metadata stored by the source data protection storage; and deactivating, in response to determining the synchronization is complete, the data connection between the production backup system and the isolated recovery system to prevent access to the isolated recovery system from the production environment.

15. A computer program product comprising a non-transitory computer-readable medium having a computer-readable program code embodied therein to be executed by one or more processors, the program code including instructions to:

receive, from a source data protection storage of a production backup system and at a target data protection storage of an isolated recovery system, application metadata associated with a backup application, the backup application performing backup operations associated with the production backup system, the isolated recovery system being isolated from the production backup system;

apply a retention lock to the application metadata stored by the target data protection storage of the isolated recovery system, the application of retention lock causing a set of immutable application metadata copies to be created and persistent for a predefined time period;

restore the application metadata stored by the target data protection storage to a sandboxed environment within the isolated recovery system;

create an instance of the backup application within the sandboxed environment within the isolated recovery system using the restored application metadata; and expose the instance of the backup application in the isolated recovery system to the production backup system.

16. The computer program product of claim 15, wherein the program code includes further instructions to:

receive, from the production backup system, an indication of a security threat; and perform, within the sandboxed environment and on the instance of the backup application, one or more tests associated with the security threat.

17. The computer program product of claim 15, wherein the program code includes further instructions to:

provide, from the isolated recovery system and to the production backup system, the recovery instance of the backup application to recover the backup application that has been rendered unusable by a security threat on the production backup system.

18. The computer program product of claim 15, wherein the program code includes further instructions to:

provide, from the isolated recovery system and to the production backup system, the restored application metadata to recover the application metadata that has been rendered unusable by a security threat on the production backup system.

19. The computer program product of claim 15, wherein creating the instance of the backup application includes installing the backup application within the sandboxed environment using the restored application metadata.

20. The computer program product of claim 15, wherein the program code includes further instructions to:

activate a data connection between the production backup system and the isolated recovery system;

initiate a transfer of data, via the activated data connection and from the production backup system to the isolated recovery system, that synchronizes the application metadata stored by the target data protection storage with a version of the application metadata stored by the source data protection storage; and deactivate, in response to determining the synchronization is complete, the data connection between the production backup system and the isolated recovery system to prevent access to the isolated recovery system from the production environment.

\* \* \* \* \*